United States Patent [19]

Nowisch et al.

[11] Patent Number: 4,476,019

[45] Date of Patent: Oct. 9, 1984

[54] PELLET DRYER

[75] Inventors: Heinz K. Nowisch; Richard O. Alguire, both of Fulton, N.Y.

[73] Assignee: The Black Clawson Company, Middletown, Ohio

[21] Appl. No.: 475,815

[22] Filed: Mar. 16, 1983

[51] Int. Cl.[3] ............ B01D 29/10

[52] U.S. Cl. ............ 210/232; 34/147; 34/187; 209/250; 210/249; 210/316; 210/414; 210/415; 210/454

[58] Field of Search ............ 34/122, 147, 184, 185, 34/187; 209/273, 305, 306, 409, 412, 250; 210/157, 161, 232, 360.1, 369, 380.1, 413, 414, 415, 447, 456, 454, 512.1, 512.3, 241, 249, 433.1, 316

[56] References Cited

U.S. PATENT DOCUMENTS

| | | | |
|---|---|---|---|
| 584,195 | 6/1897 | Robinson et al. | 210/414 X |
| 2,478,651 | 8/1949 | Blachere | 210/414 X |
| 2,699,871 | 1/1955 | Stem | 209/412 X |
| 2,902,156 | 9/1959 | Dahlberg | 210/109 |
| 3,344,532 | 10/1967 | Bigler | 34/133 |
| 3,458,045 | 7/1969 | Dudley | 210/316 X |
| 3,696,521 | 10/1972 | Hubbard | 34/133 X |
| 4,028,248 | 6/1977 | Murauskas et al. | 210/447 X |
| 4,218,323 | 8/1980 | McCracken | 210/415 |

OTHER PUBLICATIONS

Bulletin CD-4R of Carter-Day Company, Minneapolis, Minnesota Dated 11/1971, "Carter-Day SpinAway Dryers."

*Primary Examiner*—Richard V. Fisher
*Assistant Examiner*—W. Gary Jones
*Attorney, Agent, or Firm*—Biebel, French & Nauman

[57] ABSTRACT

A pellet dryer is disclosed for removing plastic pellets from entraining water and drying the same. The rotating structure of the pellet dryer is essentially contained and supported on a door of a cabinet, so that the opening of the cabinet door exposes the pellet dryer structure and the interior of the cabinet for cleaning.

3 Claims, 2 Drawing Figures

PELLET DRYER

BACKGROUND OF THE INVENTION

This invention relates to pellet dryers of the general kind shown in U.S. Pat. No. 3,458,045 issued July 29, 1969, in which plastic pellets, delivered from an underwater pelletizer or the like are separated from the entraining water and dried. Such dryers commonly employ a generally cylindrical housing or chamber, the walls of which are at least partially formed of screening material, and a pellet lifting rotor mounted within the interior of the chamber. The rotor includes lifting paddles or vanes about the rotor periphery which are set at an angle to impart to the pellets a rotary and lifting motion, and at the same time sending the pellets with some centrifugal force against the screen, to separate water from the surface of the pellets. Such dryers also commonly provide for air flow into the interior of the rotor, with openings in the rotor which permit the air to contact the pellets. The pellets are thus lifted by the rotary vane structure to an upper portion of the housing where they are expelled through an outlet opening. The water is commonly collected at the bottom of the housing and extracted through a drain.

From time to time it is necessary to clean out the rotor structure, the enclosing housing, and the overall case or cabinet. This is particularly required whenever it is desired to make a change in the material which is being pelletized, such as where the grade, quality, and/or color of the material is being changed. In such instances, it is thus necessary to open and/or remove panels and access doors in the housing, to provide access for cleaning up and removing existing pellets which may be captured or entrained within pockets or corners, or stuck in the screens. A considerable down time is experienced in such clean out operations due to the relative inaccessibility to the rotating components as well as to the full interior of the enclosing cabinet.

SUMMARY OF THE INVENTION

This invention relates to a pellet dryer which is designed to be readily cleanable and easily maintained. The rotating and separating components are mounted on a door of the dryer cabinet. Closing the cabinet door brings the pellet inlet on the cabinet into registration with a mating inlet formed in the non-rotating housing or screen structure of the rotor, so that the initially dewatered pellets are brought in from the exterior of the housing to the interior of the rotor for lifting and drying. Additionally, closing of the door brings the air inlet portion of the rotor into registration with an air inlet formed on the cabinet for the purpose of admitting air into the interior of the rotating structure. The cabinet is further provided with an air outlet opening which may, if desired, be connected with the blower for augmenting the flow of air therethrough.

The water which is expelled through the non-rotating screen of the non-rotating housing is collected on the floor of the cabinet. The cabinet floor slopes toward a cabinet outlet slot, and this outlet slot opens into the pellet inlet slurry box, below a diagonal separation screen and into a water outlet.

By opening the housing door, the rotating housing structure as well as the interior of the cabinet itself are fully exposed, thus substantially reducing the time necessary for cleaning. The only connection to the door is a pellet outlet tube which mates or is connected with the dryer outlet, which may be a flexible tube, and the power wires to the drive motor. The pellet slurry inlet, and air and water outlets are associated with the cabinet and do not need to be disturbed. The rotor drive motor is mounted on the door and thus there is no need to disconnect the drive motor from the rotor or drum, or the drum from its mounting structure, for internal cleaning.

It is accordingly an important object of the invention to provide a pellet dryer as outlined above in which the rotor housing, the rotor and the drive motor are mounted on a door of an enclosing cabinet.

A further object of the invention is the provision of a pellet dryer which may be cleaned with a minimum of down time.

A still further object of the invention is the provision of a pellet dryer in which the major rotating and working components are carried exclusively on a door of an enclosing cabinet, which door may be opened to expose such components for cleaning and maintenance.

These and other objects and advantages of the invention will be apparent from the following description, the accompanying drawings and the appended claims.

DESCRIPTION OF THE PREFERRED EMBODIMENT

Figure 2:
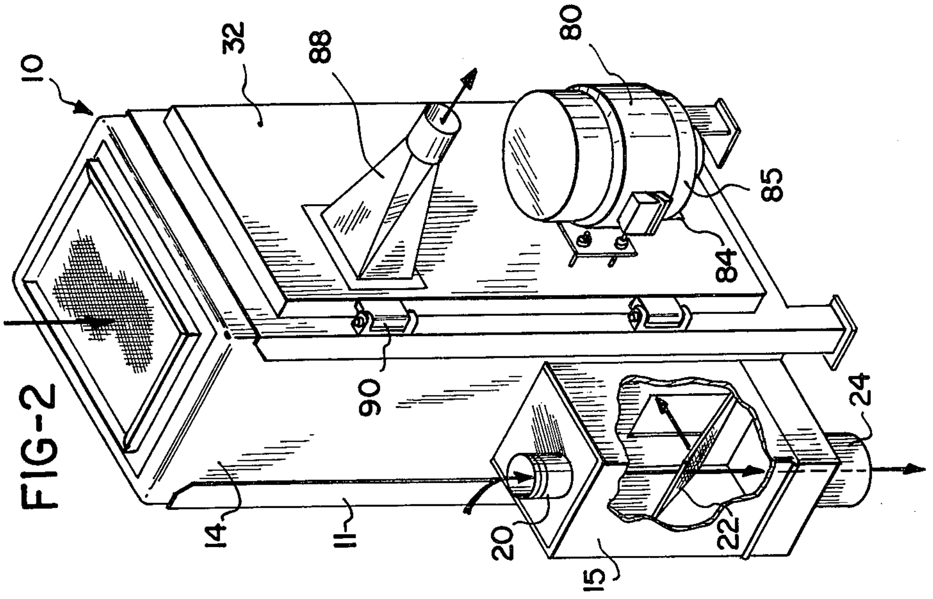
FIG. 2 is an isometric view of the pellet dryer with the door closed, and in its normal operative position.
Figure 1:
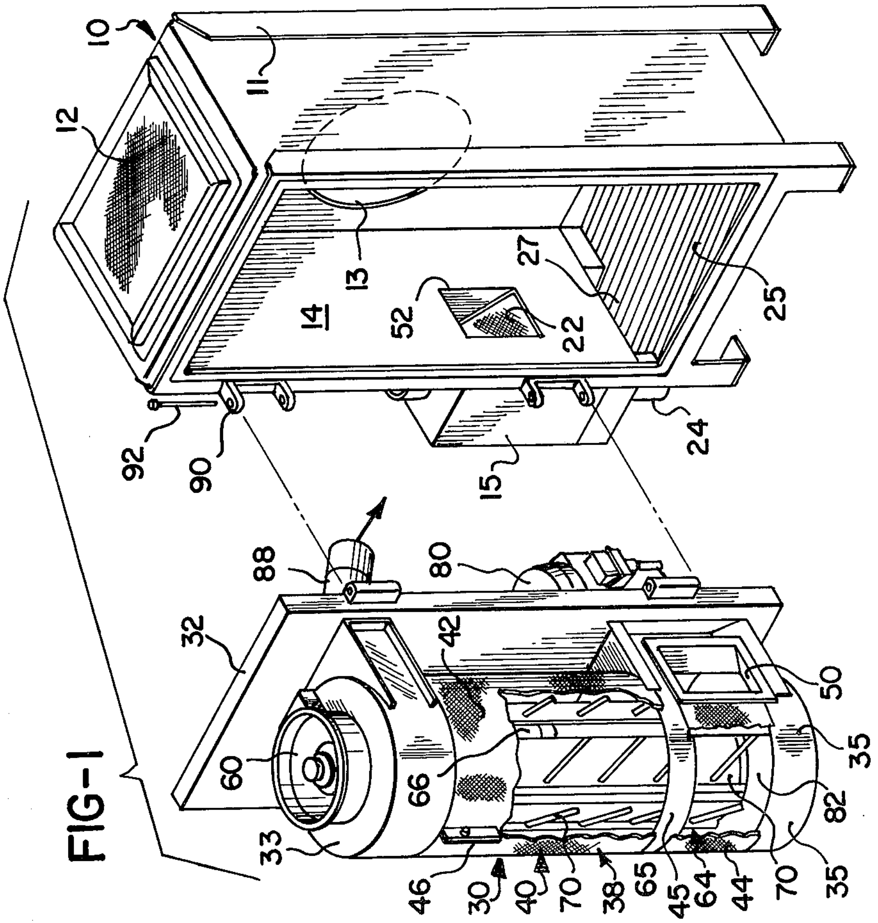
FIG. 1 is a partially broken away isometric view of the pellet dryer, with the door shown exploded or in spaced relation from the cabinet itself, for the purpose of illustration.

A pellet dryer constructed according to the teachings of this invention is illustrated in FIGS. 1 and 2 as including a generally rectangular upstanding cabinet 10 supported on four angle iron vertically extended legs 11. The cabinet 10 is provided with a screened air inlet opening 12 formed on the top thereof, for admitting air into the interior of the cabinet and an air outlet 13 in the back wall. One side wall 14 of the cabinet 10 supports a pellet inlet box 15 adjacent the bottom of the cabinet on the outside of the cabinet. The box 15 includes a pellet inlet 20 which leads into an interior space divided by a 45° diagonal screen 22. Pellets enter through the inlet 20, entrained in water, from an underwater pelletizer or pellet cutting apparatus, and impact the screen 22 where a substantial portion of the water is removed. The water is removed from the bottom of the box 15 through a water outlet 24. Additionally, the cabinet 10 is provided with a sloping floor 25 leading to an outlet slot 27 opening into the interior of the inlet box 15 beneath the screen 22, and in communication with the water outlet 24.

The pellet dryer of this invention includes a generally vertically extending rotor housing 30, as illustrated generally in FIG. 1, mounted on the inside surface of a cabinet door 32. The door preferably extends the full height of the cabinet. The rotor housing 30 includes an upper frame member 33 supported on the inside surface of the door 32, and a lower frame member 35 also supported on the door 32. Extending between the upper and lower frames is a generally cylindrical extraction section 38, having a cylindrical screened wall 40. The screened wall, for the convenience of construction, may have an upper wall portion 42 and a lower wall portion 44 separated by a frame band 45. The screens are flange-joined along a vertical abutting flange 46 which may be parted for access into the rotor housing interior.

The lower frame portion 44 includes a side-opening rectangular inlet 50 which is registrable with a corresponding retangular opening 52 formed in the wall 14 for receiving pellets from the inlet box 15 into the interior of the rotor housing 30. The upper rotor housing section 33 includes a central air inlet opening 60 which admits air into the interior of the rotor structure from the cabinet air inlet 12.

The rotor 64 is made up of a plurality of vertically extending, circumferentially arranged plates 65 carried by spiders or other suitable support on a central shaft (not shown). The plates 65 have vertical spaces 66 therebetween, through which air may flow from the interior of the rotor. The plates 65 have inclined vanes or impellers 70 positioned on the outside surfaces in vertically spaced relationship, and set at an angle to the direction of rotation to impart an upward component of movement to pellets within the screened wall 40. The rotor 64 is vertically mounted for rotation in the housing 30, and is driven by a motor 80. The motor 80 is mounted on an outside surface of the door 32 and drives the rotor 64 through belting, not shown.

The rotor 64 may be provided with a conventional pulley (not shown) beneath the floor 82 of the lower housing portion 35, and the drive belt extends through a suitable access slot 84 (FIG. 2) formed near the bottom of the door and over a pulley 85 on the motor 80.

The pellets are gathered in the upper housing 33 and are discharged through a pellet outlet 88 which extends from the interior of the door through the exterior thereof, as shown in FIG. 2. The door 32 itself is mounted on hinges 90 secured by pins 92 and is normally held closed by a suitable latch (not shown). The opening of the door 32 exposes the entire rotor housing structure 30 for cleaning, and separates the rotor inlet 50 from the cabinet inlet 52. Additionally the interior of the cabinet is fully exposed for cleaning.

The operation of the invention is largely self-evident from the foregoing description. The pellet dryer receives pellets entrained in water through the inlet 20 of the box 15. A major portion of the water is separated by the inclined screen 22, so that the separated water flows through the box bottom or outlet 24. Air is brought through the screened opening 12 into the rotor opening 60, and the rotor 64 is driven by the motor 80 at a relatively high rate of speed, which may be in the order of 800 rpm. The initially dewatered pellets are engaged by the inclined vanes 70 and are driven both upwardly and outwardly against the interior surface of the screened wall portions 42 and 44, and water extracted flows through the screens and into the interior of the cabinet where it is extracted by the inclined floor 25, through the slot 27, and to the outlet 24. The dried pellets are carried in the upper housing or frame member where they are extracted through the outlet 88.

When it is desired to make a change in the production of the pellets, such as for changing the composition, color or the like, it is necessary to clean the pellet dryer to prevent contamination of the product. Thus the cabinet door 32 may be swung open, thereby exposing the interior of the pellet and the entire rotating structure. The screen sections 40 and 42 may then be opened at the flanges 46 exposing the interior of the rotating structure for further washing out and cleaning of any pellets lodged or trapped therein. If any pellets have been lodged or trapped on the screen 22, they may now be reached through the opening 52 and likewise removed. Following cleaning, the dorm of the cabinet may be closed and secured, conventionally, for operation.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a rotating pellet dryer for removing plastic pellets from entraining water and drying the same including a rotor housing and a rotor in the housing mounted on a generally vertical axis for lifting the pellets from a housing inlet upwardly while imparting rotational and outward movement therefrom with extraction of water through a generally cylindrical screen surrounding the rotor, the improvement comprising:

an enclosing cabinet normally totally surrounding the rotor having a door formed as one wall thereof, upper and lower spaced apart rotor housing support means mounted on said door, said rotor being rotatably supported on said door between said upper and lower housing support means with said cylindrical screen means extending between said support means, rotor drive motor means carried on said door at a side thereof opposite said support means, said cabinet having pellet inlet means in alignment with said housing inlet when said door is closed for delivering pellets to said rotor, means on said door defining pellet outlet means connecting to said upper housing support means and extending outwardly through said door, means for draining water from said cabinet, and said door being pivotally mounted to said cabinet for movement outwardly therefrom for exposing said rotor housing and the interior of said cabinet for cleaning and maintenance.

2. The dryer of claim 1 further comprising a box mounted in a side wall of said cabinet having an inlet and a water outlet, and a separating screen extending diagonally in said box for delivering pellets through said cabinet inlet means, said cabinet drain means defining an opening in said side wall providing for flow of water into said box below said screen, and means on said box forming a water outlet opening to receive water from said screen and said cabinet opening.

3. A rotating pellet dryer for separating plastic pellets formed in an underwater pelletizer from the entraining water and in drying the same, comprising:

a cabinet having a door forming essentially one wall of the cabinet, a rotor housing mounted on an inside vertical surface of said door, said rotor housing including a pellet drying rotor therein and a surrounding water extraction screen, said housing further having pellet inlet means adjacent a lower end thereof for delivering pellets to said rotor, and a pellet outlet formed adjacent the top thereof and extending from said housing through said door for the delivery of dried pellets therefrom, motor means for driving said rotor mounted on said door on an outside surface thereof, said cabinet having pellet inlet means formed in one side wall thereof registrable with said pellet housing inlet means when said door is closed, said cabinet further having air inlet means formed in the top thereof registrable with the interior of said rotor when said door is closed, and further having an air outlet in a back wall thereof opposite said door, a sloping floor formed on the bottom of said cabinet leading toward said one side wall, and means in said one side wall of said cabinet defining an outlet opening at the low side of said sloping floor for extraction of water from said cabinet.

* * * * *